(12) United States Patent
Mizumori (10) Patent No.: US 8,199,241 B2
(45) Date of Patent: Jun. 12, 2012

(54) DATA REPRODUCING APPARATUS, DATA REPRODUCING METHOD, AND STORAGE MEDIUM

(75) Inventor: Ryuta Mizumori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 335 days.

(21) Appl. No.: 11/779,756

(22) Filed: Jul. 18, 2007

(65) Prior Publication Data
US 2008/0024645 A1 Jan. 31, 2008

(30) Foreign Application Priority Data

Jul. 26, 2006 (JP) .................................. 2006-203733

(51) Int. Cl.
*H04N 5/222* (2006.01)
(52) U.S. Cl. ..................................... 348/333.11; 386/95
(58) Field of Classification Search .................... 386/95; 348/333.11
See application file for complete search history.

(56) References Cited

U.S. PATENT DOCUMENTS

| | | | | |
|---|---|---|---|---|
| 5,903,309 A * | 5/1999 | Anderson | ............... | 348/333.02 |
| 7,068,307 B2 * | 6/2006 | Hyodo | ............... | 348/220.1 |
| 7,451,407 B2 * | 11/2008 | Brodie et al. | ............... | 715/828 |
| 7,586,533 B2 * | 9/2009 | Matsumoto | ............... | 348/333.05 |
| 2002/0003576 A1 * | 1/2002 | Konishi et al. | ............... | 348/232 |
| 2002/0093571 A1 * | 7/2002 | Hyodo | ............... | 348/220 |
| 2002/0197067 A1 * | 12/2002 | Ohnishi | ............... | 386/120 |
| 2006/0120692 A1 * | 6/2006 | Fukuta | ............... | 386/95 |

FOREIGN PATENT DOCUMENTS

JP 2003-032582 A 1/2003

* cited by examiner

*Primary Examiner* — Tuan Ho
*Assistant Examiner* — Antoinette Spinks
(74) *Attorney, Agent, or Firm* — Canon USA, Inc., IP Division (57) ABSTRACT

A data reproducing apparatus enables selection between a first display mode and a second display mode. If the first display mode is selected, images indicating a first type of data and an icon indicating at least one of a second type of data are displayed. And, if the second display mode is selected, an icon indicating at least one of the first type of data and images indicating the second type of data are displayed.

19 Claims, 10 Drawing Sheets

DATA REPRODUCING APPARATUS, DATA REPRODUCING METHOD, AND STORAGE MEDIUM

BACKGROUND OF THE INVENTION

1. Field of the Invention

The present invention relates to data reproducing apparatuses, data reproducing methods, and storage media, and specifically to data reproducing apparatuses, data reproducing methods, and storage media for displaying moving image data and still image data.

2. Description of the Related Art

Various digital video cameras are available equipped with semiconductor memory cards and use recordable DVD disks as storage media. Digital video cameras also exist which are capable of recording and reproducing both moving image data and still image data.

Such digital video cameras have a recording mode for recording mainly image information, and a reproducing mode for reproducing recorded content.

Digital video cameras are in general provided with a single file reproducing mode for reproducing one set of image data from among the recorded image data. There also exist digital video cameras with an index display mode for reproducing a plurality of sets of image data stored on a storage medium, or thumbnail data thereof, and displaying them as a list. Note that thumbnails are sets of image data for display whose volume is smaller than that of the original images. For moving image data, a representative still image frame from each moving image recording data file is treated as the thumbnail.

Figure 10:
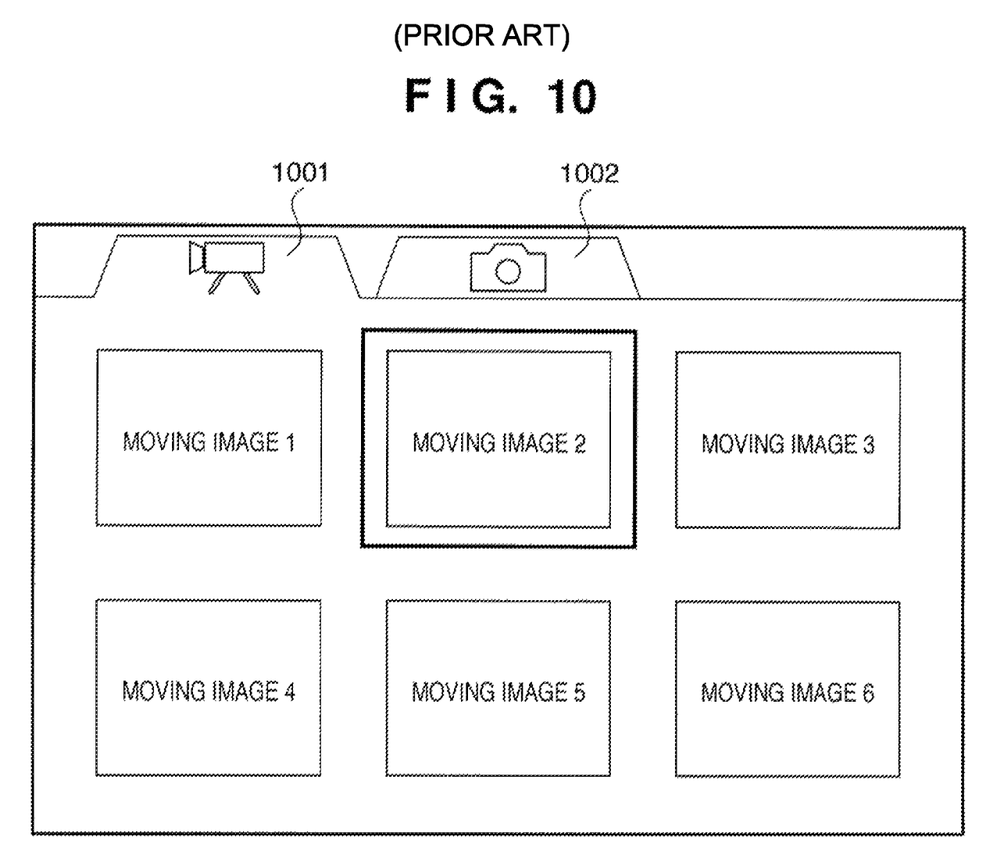
FIG. 10 is a view of an index screen using tabs of conventional technology.

Further, some digital video cameras use a concept known as "tabs" in index screens displaying lists of images in index display mode. FIG. 10 shows an example of image display using tabs. Reference number 1001 denotes a moving image tab and reference number 1002 denotes a still image tab. When a user operation selects the moving image tab 1001, the moving image data is extracted and displayed as a list. When the still image tab 1002 is selected, the still image data is extracted and displayed as a list. Thus, by associating a data format such as, for example, still images or moving images, to each tab, it is possible to distinctly display image data of differing formats on a single index screen. Aside from tabs, there exist other methods for handling image data of differing formats in the reproduction screen, such as methods using commands in a menu screen or operation of a mechanical switch on the digital video camera unit as a trigger.

Further, many types of technologies have been proposed pertaining to reproducing recorded data files in apparatuses capable of reproducing image data other than digital video cameras. For example, Japanese Patent Laid-Open No. 2003-032582 discloses a technology for displaying on a single screen information related to the various content displayed in an index screen.

However, with conventional technology, a user was required to select tabs, operate mechanical switches on the reproducing apparatus, and so on when changing the screen display from a reproduction screen for one specific type of image data to another reproduction screen. When switching reproduction screens using tabs, the user is required to move a selection cursor in the screen to a tab outside the display area for the image data, and perform a selection operation. Further, with selection using a mechanical switch, the user is required to operate a mechanical switch every time the user wishes to switch reproduction screens. Further, the user cannot know that other types of image data exist while one specific type of image data is being displayed.

SUMMARY OF THE INVENTION

Accordingly, an embodiment of the present invention is directed to providing a display screen that allows a user viewing the screen easily to know that a plurality of types of data exist.

According to an aspect of the present invention, an embodiment is directed to a data reproducing apparatus including: a selecting unit configured to select one of a first display mode and a second display mode; and a display control unit configured to (a) display images indicating respective sets of first type of data and an icon indicating at least one set of second type of data if the first display mode is selected, and (b) display an icon indicating at least one set of the first type of data and images indicating respective sets of the second type of data if the second display mode is selected.

According to another aspect of the present invention, an embodiment is directed to a method including: selecting one of a first display mode and a second display mode; displaying images indicating respective sets of the first type of data and an icon indicating at least one set of the second type of data if the first display mode is selected; and displaying an icon indicating at least one set of the first type of data and images indicating respective sets of the second type of data, if the second display mode is selected.

According to yet another aspect of the present invention, an embodiment is directed to a computer-readable storage medium storing a program for causing an apparatus to perform operations comprising: selecting one of a first display mode and a second display mode; displaying images indicating respective sets of the first type of data and an icon indicating at least one set of the second type of data if the first display mode is selected; and displaying an icon indicating at least one set of the first type of data and images indicating respective sets of the second type of data, if the second display mode is selected.

Further features of the present invention will become apparent from the following description of exemplary embodiments with reference to the attached drawings.

DESCRIPTION OF THE EMBODIMENTS

The data reproducing apparatus according to embodiments of the present invention is described below, with reference to the drawings.

First Embodiment

Figure 1:
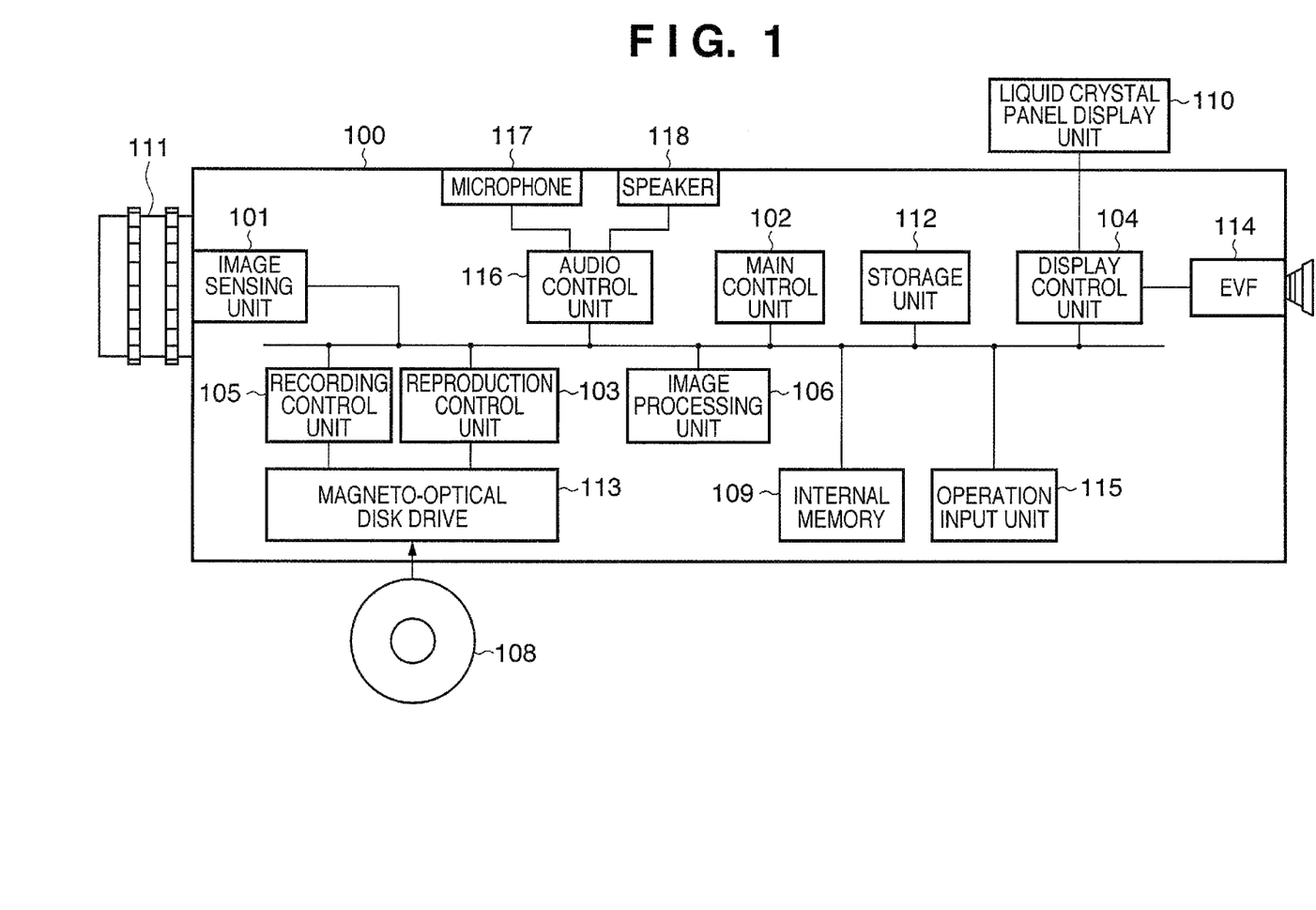
FIG. 1 is a functional component block diagram of a video camera incorporating a data reproducing apparatus according to an embodiment of the present invention.

FIG. 1 is a block diagram of a digital video camera 100 incorporating a reproducing apparatus according to a first embodiment of the present invention. An image sensing unit 101 controls an image sensing element such as a CCD and shoots moving images and/or still images of a subject obtained via an image sensing lens 111. Image data obtained from the image sensing unit 101 is converted to a specific data type by an image processing unit 106. The converted image data is recorded onto a storage medium in file format by a recording control unit 105. The storage medium in an embodiment is a removable and overwritable magneto-optical disk 108. The magneto-optical disk 108 is used by inserting it into a magneto-optical disk drive 113. Naturally, the storage medium is not limited to a magneto-optical disk, but may be, for example, non-volatile memory built in to the digital video camera 100, or a memory card such as an SD card.

Reference number 110 denotes a liquid crystal panel display unit. When displaying recorded image data using the liquid crystal panel display unit 110, a reproduction control unit 103 receiving an instruction from a main control unit 102 reads the magneto-optical disk 108. The main control unit 102 generates image data for display by processing the read image data. The generated image data for display is sent to a display control unit 104. The display control unit 104 causes the liquid crystal panel display unit 110 to display the image data for display.

Various programs, including operations pertaining to execution of the embodiments of the present invention, are stored in a storage unit 112, and the digital video camera 100 operates according to control by the main control unit 102 which causes these programs to run. An internal memory 109 temporarily stores image data, which is content, and is used as a work area for the main control unit 102. The digital video camera 100 is provided with an electronic view finder (EVF) 114 to a rear portion. A display signal supplied to the EVF 114 is supplied, by example, by the display control unit 104. Various operation signals for operating the digital video camera 100 are input from an operation input unit 115. The digital video camera 100 is further provided with a microphone 117 and a speaker 118, which are controlled by an audio control unit 116. The main control unit 102, the reproduction control unit 103, the display control unit 104, the recording control unit 105, the image processing unit 106, and the audio control unit 116 need not be individual hardware components, but rather a single hardware component fulfilling the roles of a plurality of control units.

Figure 2:
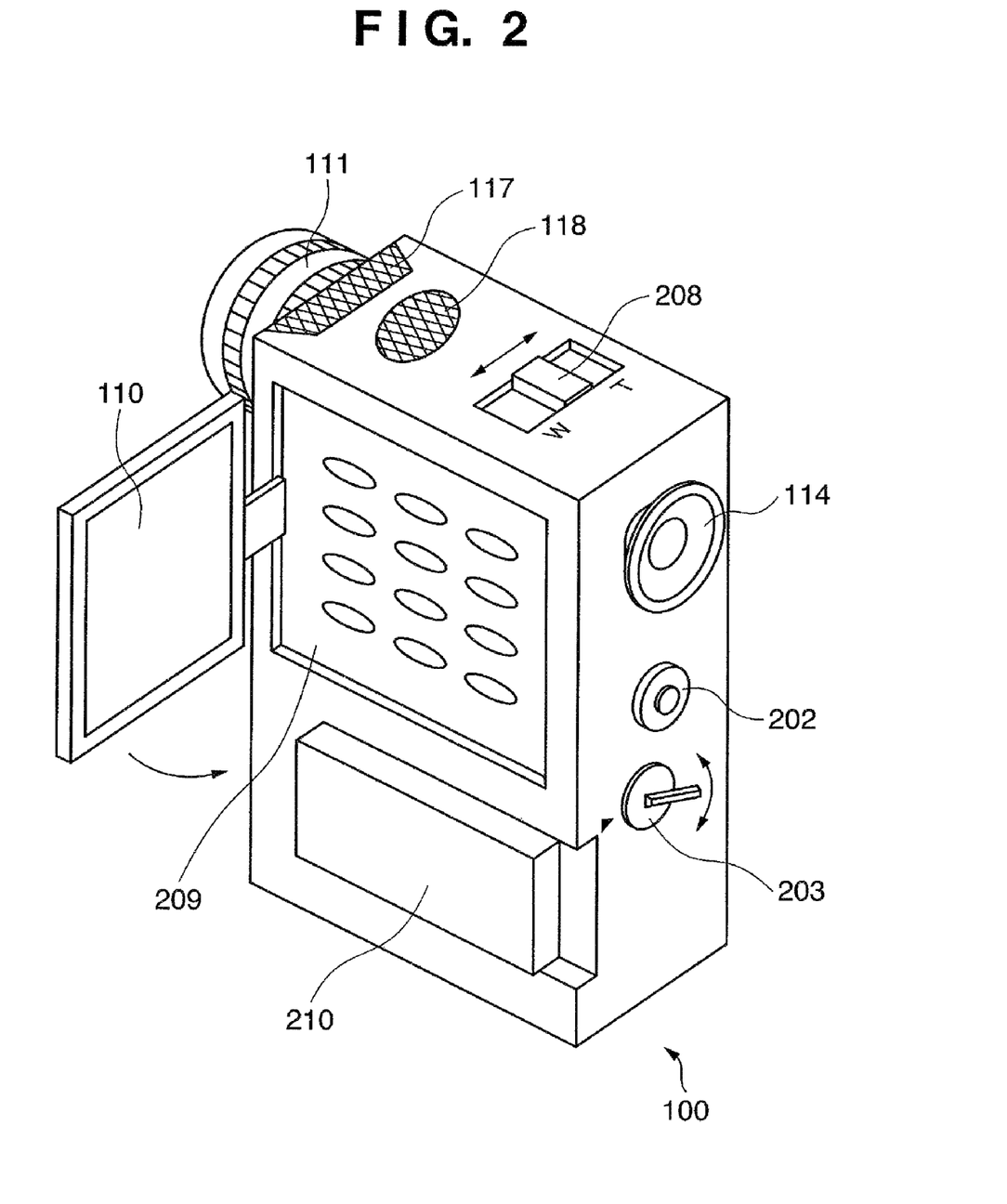
FIG. 2 is an external view of the video camera to which is applied an embodiment of the present invention.

FIG. 2 is an external view of the digital video camera 100 to which the present embodiment shown in FIG. 1 is applied. The same reference numerals are used in describing the same component parts as in FIG. 1. The digital video camera 100 has a built-in magneto-optical disk drive 113 in the interior, as described above. Accordingly, by mounting the removable magneto-optical disk 108 into the magneto-optical disk drive 113, it is possible to record image data shot by the image sensing unit 101 described using the block diagram in FIG. 1. The digital video camera 100 has the image sensing lens 111 attached to a front portion, and the EVF 114 provided to the rear portion. By looking into the EVF 114, a user can see an image to shoot or being reproduced.

Figure 9:
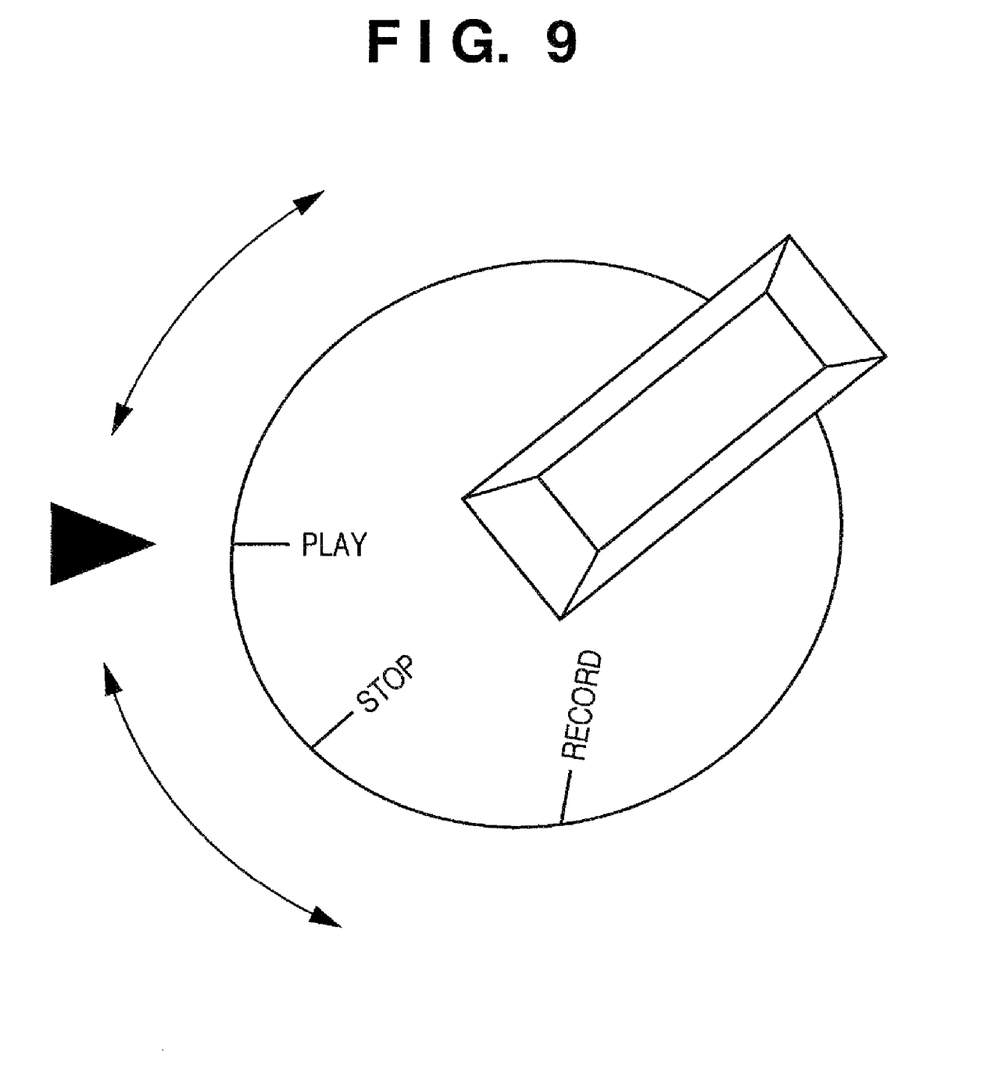
FIG. 9 is a front view of a video camera mode switching switch of the digital video camera shown in FIG. 2 according to an embodiment of the present invention.

A mode switching switch 203 is provided to the rear portion of the digital video camera 100. Modes which can be selected by the mode switching switch 203 are a recording mode for shooting a subject and recording it as image data, and a reproducing mode for reproducing the recorded image data. By operating the mode switching switch 203, the user can select whether to record image data or to reproduce and view image data. The mode switching switch 203 switches between reproduction, stop, and recording, being designed as a rotating switch with a knob, as shown in, for example, FIG. 9.

Reference number 202 denotes a recording start/stop button. Ordinarily, the recording start/stop button works as a toggle. By turning the recording start/stop button 202 once, the user instructs the digital video camera 100 to begin recording and/or to stop recording.

A zoom lever 208 is provided to a top portion of the digital video camera 100. When the mode switching switch 203 is in a position for recording mode, sliding the zoom lever 208 makes it possible to adjust the image data being recorded or standing by for recording to be wide-angle or telephoto.

When the mode switching switch 203 is in a position for reproducing mode, sliding the zoom lever allows the user to adjust the reproduction zoom of the image data being reproduced. It is also possible to switch to an index screen.

Reference number 209 on a side face portion of the digital video camera 100 denotes an operating switch unit on which a variety of operating switches are gathered, and while not shown in the drawing, a variety of keys for reproduction operation and for menu operation are disposed here. When the user operates these switches, signals corresponding to those operations are input to the digital video camera 100 via the operation input unit 115 of FIG. 1. Further, the openable liquid crystal panel display unit 110 is provided which covers the operating switch unit 209 when stored.

When the digital video camera 100 is in recording mode, the liquid crystal panel display unit 110 displays moving image data or still image data obtained by shooting with the image sensing unit 101. When the digital video camera 100 is in reproducing mode, moving image data or still image data which is already recorded to the optical disk 108 is displayed. Accordingly, with the liquid crystal panel display unit 110, the user can view moving image data or still image data being recorded or reproduced. Ordinarily, when the liquid crystal panel display unit 110 is in an open state, the EVF is inoperative, and when the liquid crystal panel display unit 110 is in a closed state, the EVF 114 is operative and the liquid crystal panel display unit 110 is inoperative. The digital video camera 100 displays recording time, remaining recording time, remaining battery, and other added information to the liquid crystal panel display unit 110 or the EVF 114. By displaying such information, the digital video camera 100 can let the user know the operating state of the digital video camera 100. Below, the liquid crystal panel display unit 110 and the EVF 114 shall be referred to together as a "display unit." Reference number 117 denotes a microphone for recording audio data together with data shot by the image sensing unit 101. Further, reference number 118 denotes a speaker, which reproduces the audio data recorded together with moving image data when reproducing the moving image data recorded to the magneto-optical disk 108. Reference number 210 denotes a battery, which supplies power needed to operate the digital video camera 100.

Next follows a description of reproducing mode according to an embodiment.

In an embodiment, when the user operates the mode switching switch 203, the digital video camera 100 switches to reproducing mode for reproducing and displaying image data recorded to the magneto-optical disk 108.

The digital video camera 100 further performs index display when the user operates the operating switch unit 209 or the zoom lever 208. Index display is a display state in which a plurality of sets of image data or information indicating a plurality of sets of image data are displayed as a list in a single screen. There are two types of index display in an embodiment. The first is still image index display and the second is moving image index display. These index display processes are described below using the flowcharts shown in FIG. 3 and FIG. 4.

Figure 3:
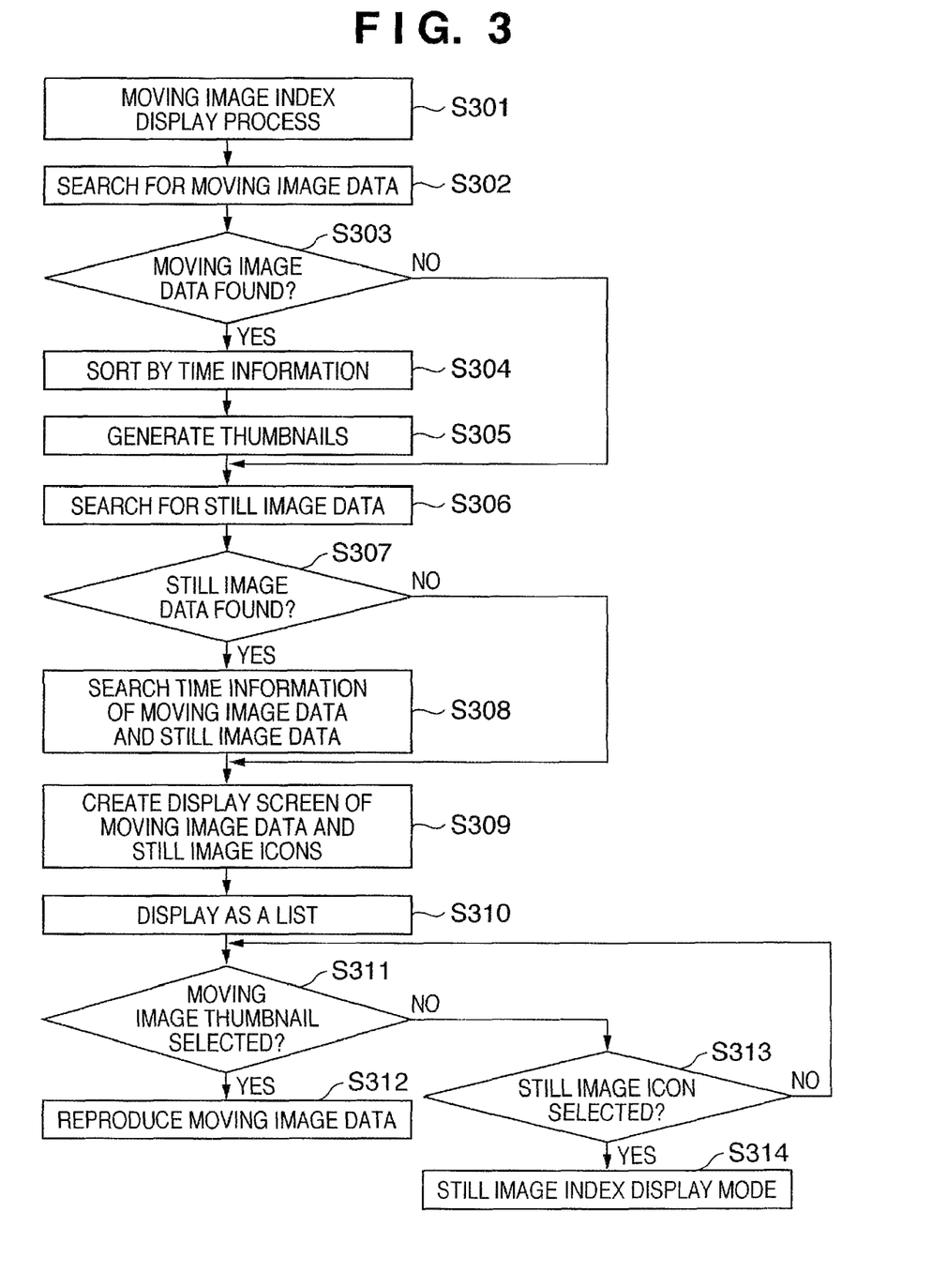
FIG. 3 is a flowchart in moving image reproducing mode in a video camera to which is applied an embodiment of the present invention.
Figure 4:
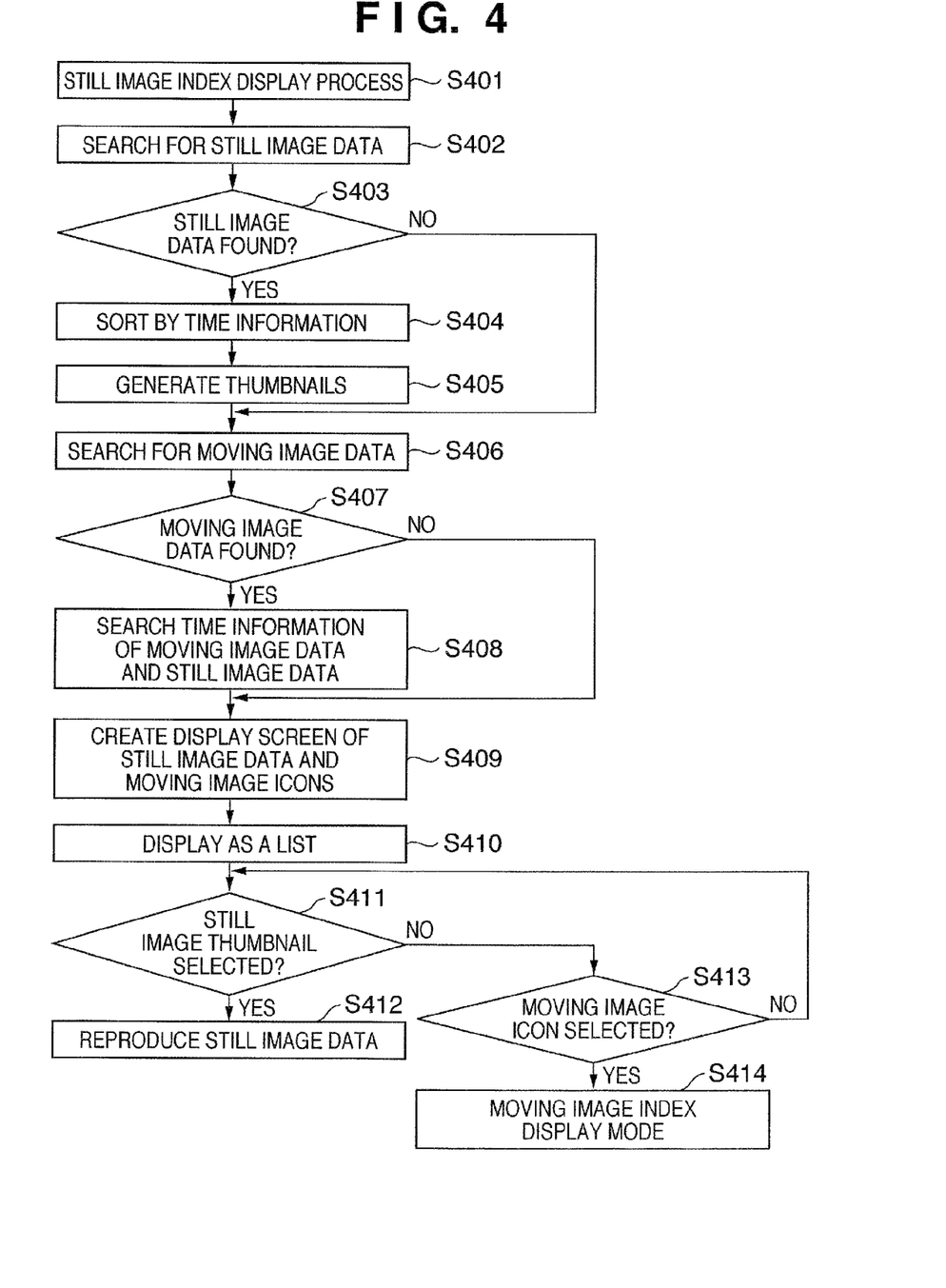
FIG. 4 is a flowchart in still image reproducing mode in a video camera to which is applied an embodiment of the present invention.

FIG. 3 shows a flowchart of a process executed by the digital video camera 100 in moving image index display. FIG. 4 shows a flowchart of a process executed by the digital video camera 100 in still image index display.

The moving image index display is described first with reference to FIG. 3.

After switching to reproducing mode, the digital video camera 100 begins the process related to moving image index display according to, for example, the zoom lever 208 being operated in step S301.

Next the process moves to step S302, and the digital video camera 100 searches the moving image data recorded to the magneto-optical disk 108. In step S303, the digital video camera 100 determines whether or not moving image data is recorded to the magneto-optical disk 108 based on the search in step S302.

If the digital video camera 100 determines in step S303 that moving image data is recorded to the magneto-optical disk 108, the process moves to step S304, the searched moving image data is sorted based on the time information when the moving image data was shot, and the process moves to step S305. In step S305, thumbnails corresponding to the detected moving image data are generated, and when this is completed, the process moves to step S306. Thumbnails are image data for display obtained by reducing image data or extracting part thereof. If the digital video camera 100 determines in step S303 that no moving image data is recorded to the magneto-optical disk 108, the process moves to step S306.

Next, in step S306, the digital video camera 100 searches to decide whether or not still image data is recorded to the magneto-optical disk 108, and then the process moves to step S307. In step S307, the digital video camera 100 determines whether or not still image data is recorded to the magneto-optical disk 108 based on the search results in step S306.

If the digital video camera 100 determines that still image data is recorded to the magneto-optical disk 108, the process moves to step S308. In step S308, the digital video camera 100 identifies between which sets of the sorted moving image data the searched still images were shot, based on the recorded time of the of the searched still image data and the recorded time of the moving image data sorted in step S304, and then the process moves to step S309. If the digital video camera 100 determines in step S307 that no still image data is recorded to the magneto-optical disk 108, the process moves to step S309.

Next, in step S309, a display screen is generated based on information on the moving image data and still image data and on the shooting time information found in the preceding series of processes. In other words, the digital video camera 100 generates a screen in which information indicating the image data is displayed as a list in shooting order, and then the process moves to step S310. An index display screen such as, for example, shown in FIG. 5 is displayed by the display unit.

Figure 5:
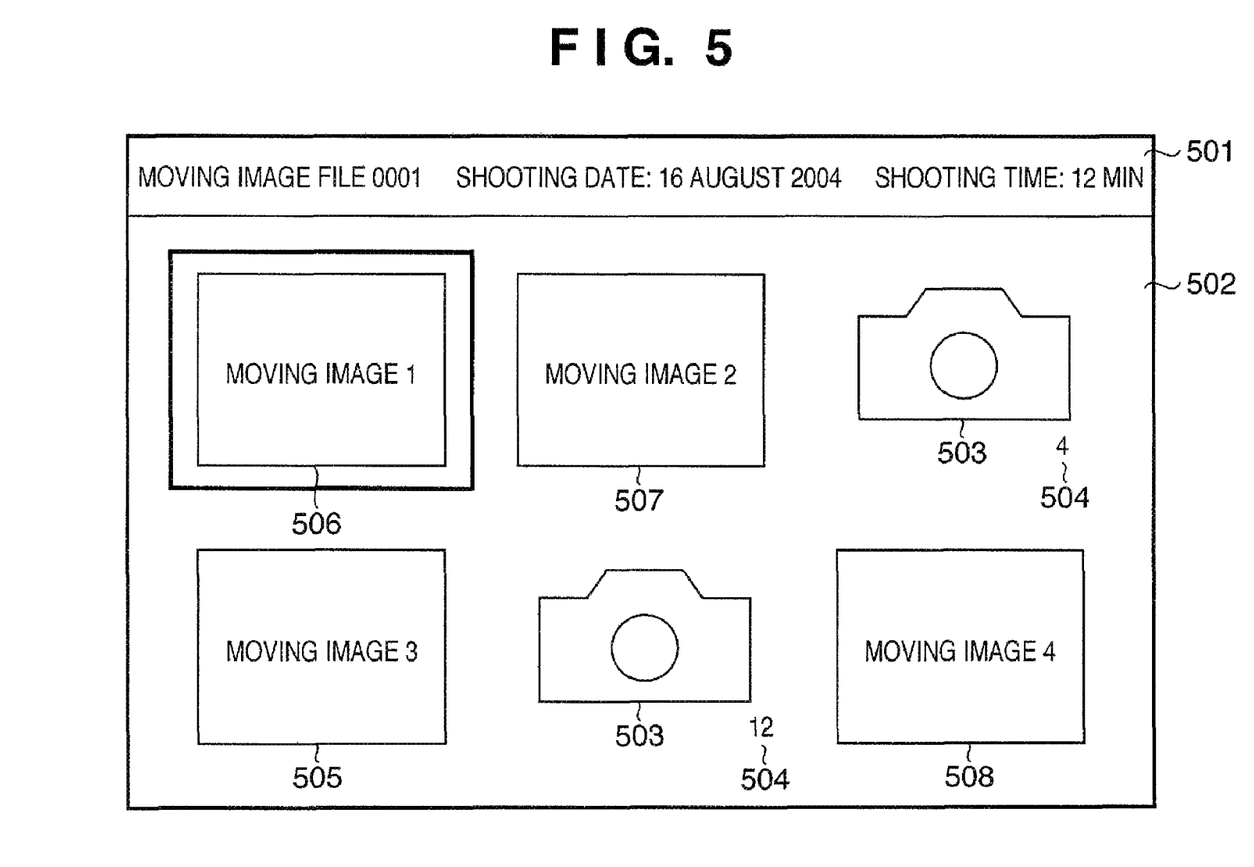
FIG. 5 is a view of an index screen output to a liquid crystal panel display unit in moving image reproducing mode in a video camera to which is applied an embodiment of the present invention.

FIG. 5 is an index display screen according to an embodiment. Reference number 501 denotes an information display area, in which is displayed a variety of information on the moving image data corresponding to the thumbnails highlighted as indicated by the cursor. In the example shown in FIG. 5, the file number, shooting date, and shooting time of a moving image file 506 are displayed. Reference number 502 denotes an index display area which can be operated by the user.

Reference numbers 505-508 denote thumbnails corresponding to sets of moving image data. As shown in FIG. 5, the digital video camera 100 displays thumbnails as information indicating moving image data in the moving image index display. Reference number 503 denote icons pertaining to still images. According to an embodiment, the numbers displayed to the bottom right of each still image icons 503 indicate the numbers of sets of still image data indicated by the icons. For example, as illustrated in FIG. 5, an image count display 504 positioned immediately below one of the icons 503 indicates that there are four sets of still image data shot between the shooting times of "moving image 2" and "moving image 3." By displaying as a list the still image icons and the thumbnails for the moving images on the same screen, the user can get an overall view of the moving images while at the same time knowing that there are still images.

In an embodiment, in a case where there is a plurality of still images which were shot between the times of the two sets of moving image data, the respective still images are displayed by a single still image icon on the display screen. By letting the user know of the existence of still image data in this way, the amount of space taken up by displaying icons in the reproduction screen can be reduced. Even in cases where the existence of a plurality of still images is shown by a single icon, the user can readily learn that there exists a plurality of still images simply by displaying an image count display 504. It is of course no problem to display one icon for each still image.

While the plurality of sets of still image data shot between the times for the two sets of moving image data is indicated by a single icon in the illustrated embodiment, there is no need to display icons vis-à-vis shooting time. For example, in cases where there is moving image data and still image data belonging to the same folder, it is also possible to display the sets of moving image data with thumbnails and the sets of still image data all together as a single icon. An example of the display in such a case is given in FIG. 8. The icon indicated by reference number 805 is an icon expressing still image data belonging to the same folder, while reference number 804 indicates the number of sets of still image data indicated by the still image icon 805.

Figure 8:
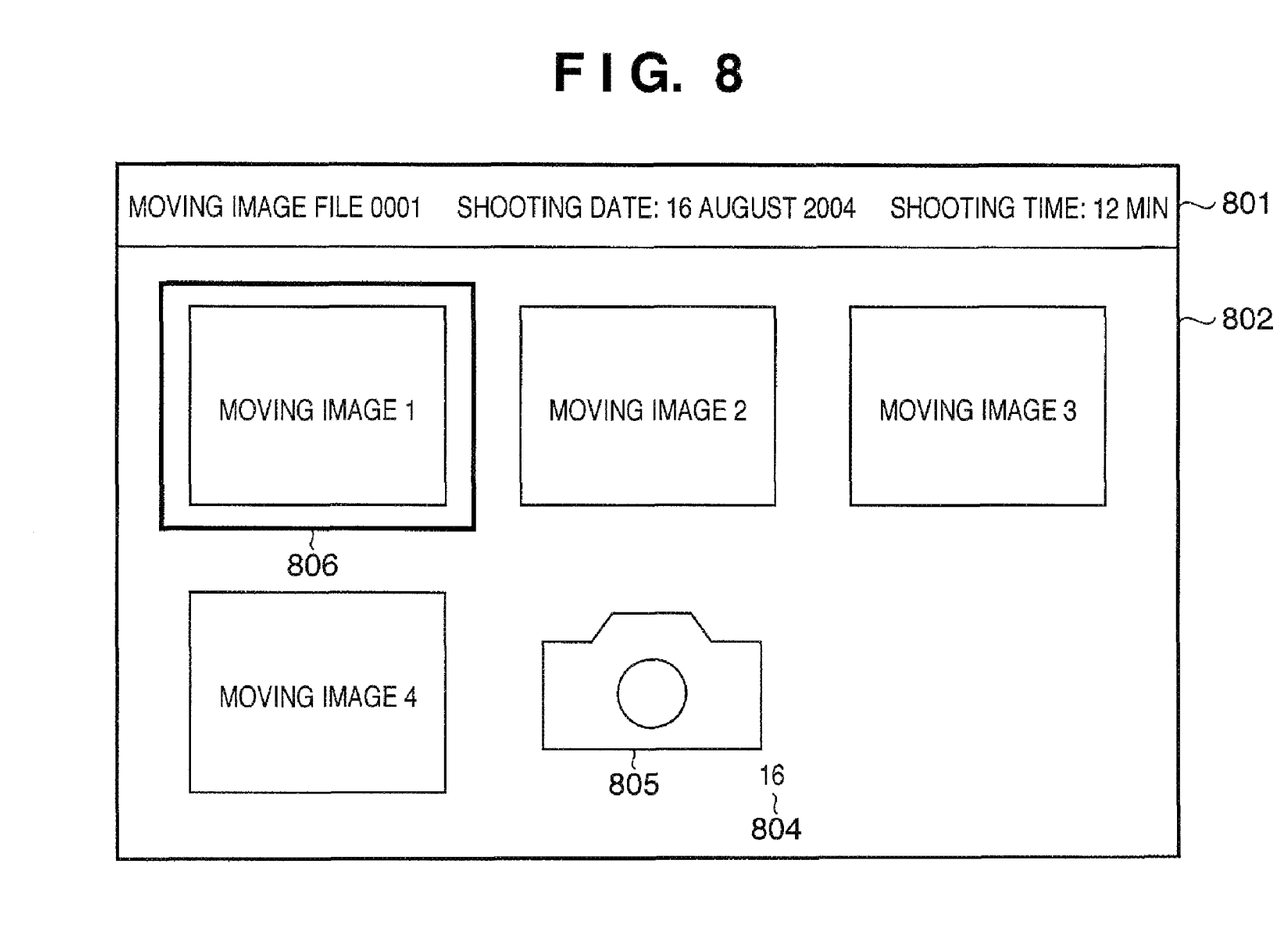
FIG. 8 is a view of another index screen output to a liquid crystal panel display unit in moving image reproducing mode in a video camera to which is applied an embodiment of the present invention.

Reference number 806 denotes a cursor capable of selecting thumbnails of sets of moving image data or icons pertaining to still images displayed in the index display area. In FIG. 8, the role of the cursor is played by moving the highlighted frame.

In step S310 of FIG. 3, the digital video camera 100 displays to the display unit the index screen generated in step S309. An example of the index screen generated in step S309 is illustrated in FIG. 5, and the moving image index display screen displays the still image icons 503 generated based on the processes from step S307 to step S309. The image count display 504 displaying the number of still images is displayed based on the process in step S308.

Next, in step S311, a case is detected in which the operating switch unit 209, for example, has selected the thumbnail of the moving image data, and the process moves to step S312. In other words, the process moves to step S312 when it is decided that the thumbnail 505 for the moving image data has been selected, and the mode for reproducing the selected moving image is entered, and reproduction of the moving image data is performed.

In step S311, if a thumbnail for moving image data is not selected, the process moves to step S313. If it is determined in step S313 that one of the still image icons was selected by, for example, the operating switch unit 209, the process moves to step S314, and still image index display mode is entered. Along with switching to the still image index display mode, a still image reproducing process for rebuilding the data for display by the display unit 110 is performed according to the flowchart shown in FIG. 4. In other words, the digital video camera 100 switches between still image index display and moving image index display according to which icon is selected.

If the still image icon was not selected in step S313, the process returns to step S311, and the digital video camera 100 waits for either a thumbnail to a still image icon to be selected.

The flowchart pertaining to the still image index display mode shown in FIG. 4 reverses the handling of the moving image data and the still image data in the flowchart pertaining to the moving image index display mode described using FIG. 3, the flow of operations basically being the same as in FIG. 3. Accordingly, a detailed description is omitted, but in step S408 onward it is possible to indicate explicitly the existence of moving image data using moving image icons 603, as shown in FIG. 6.

Figure 6:
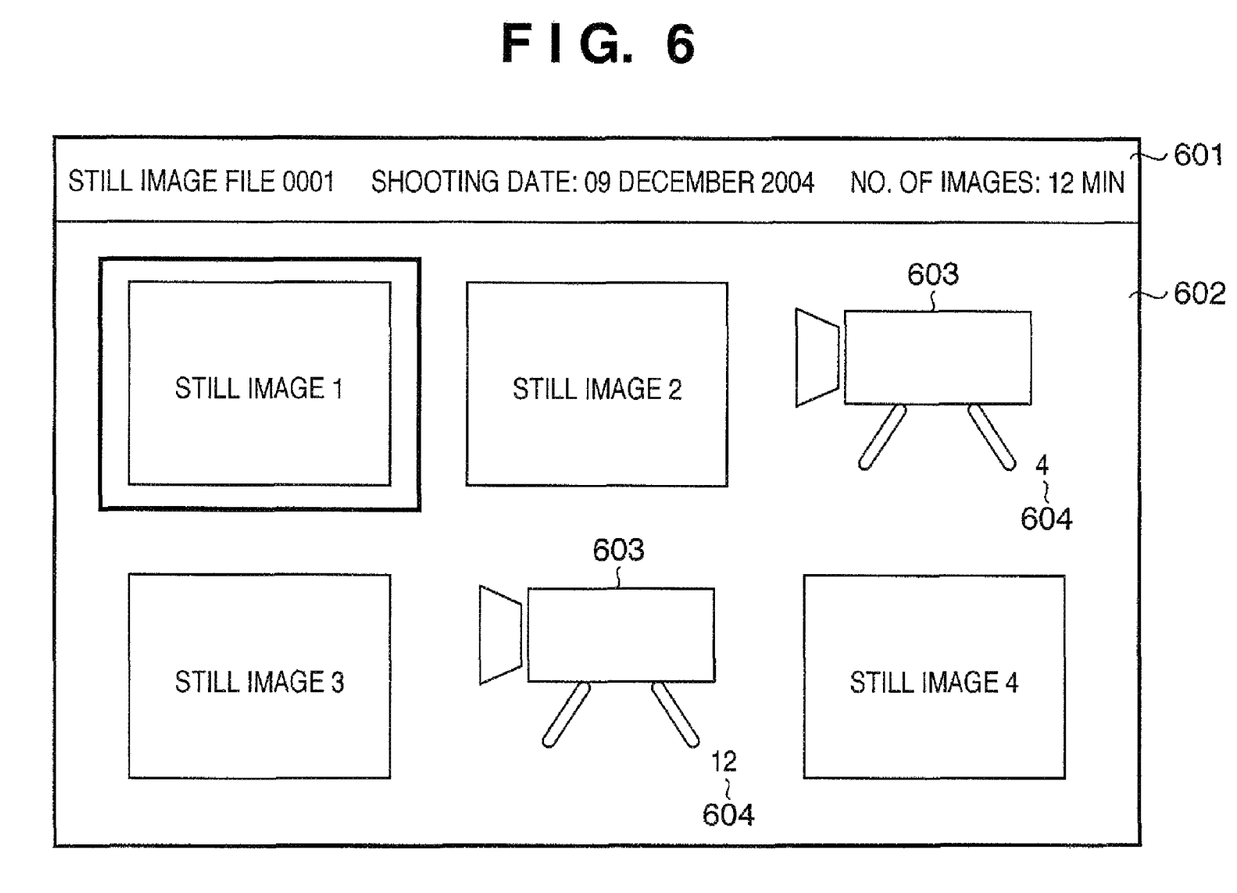
FIG. 6 is a view of an index screen output to a liquid crystal panel display unit in still image reproducing mode in a video camera to which is applied an embodiment of the present invention.

FIG. 6 shows an index screen displayed by the display unit in step S410. In the index screen of FIG. 6, reference number 601 denotes an information display area, in which is displayed a variety of information on the still image data corresponding to the thumbnails highlighted as indicated by the cursor. In the example given in FIG. 6, the still image file number, shooting date, and number of shot still images displayed as a list are displayed. Reference number 602 denotes an index display area which can be operated by the user. In FIG. 6, reference numbers 604 located at the bottom right of the moving image icons 603 indicates the length of the shooting time of the moving image data. Accordingly, for example, the number "12" would mean that the moving image data is moving image data shot over 12 minutes. Accordingly, the moving image icon is displayed for each set of moving image data. Naturally, as with the still image icon, a single moving image icon indicating a plurality of sets of moving image data may be displayed, and the number of sets of moving image data indicated by the moving image icon may be displayed.

By performing the processes according to the operations shown in the flowchart, the user can comprehensively know and easily use the content held by the digital video camera 100 in the index display screen in the liquid crystal panel display unit 110. Moreover, convenience in the reproduction screen can be improved since there is no need to require operations outside the current reproduction screen area for displaying another reproduction screen or extra operations such as operating a mechanical switch to switch to a reproduction screen.

Second Embodiment

Figure 7:
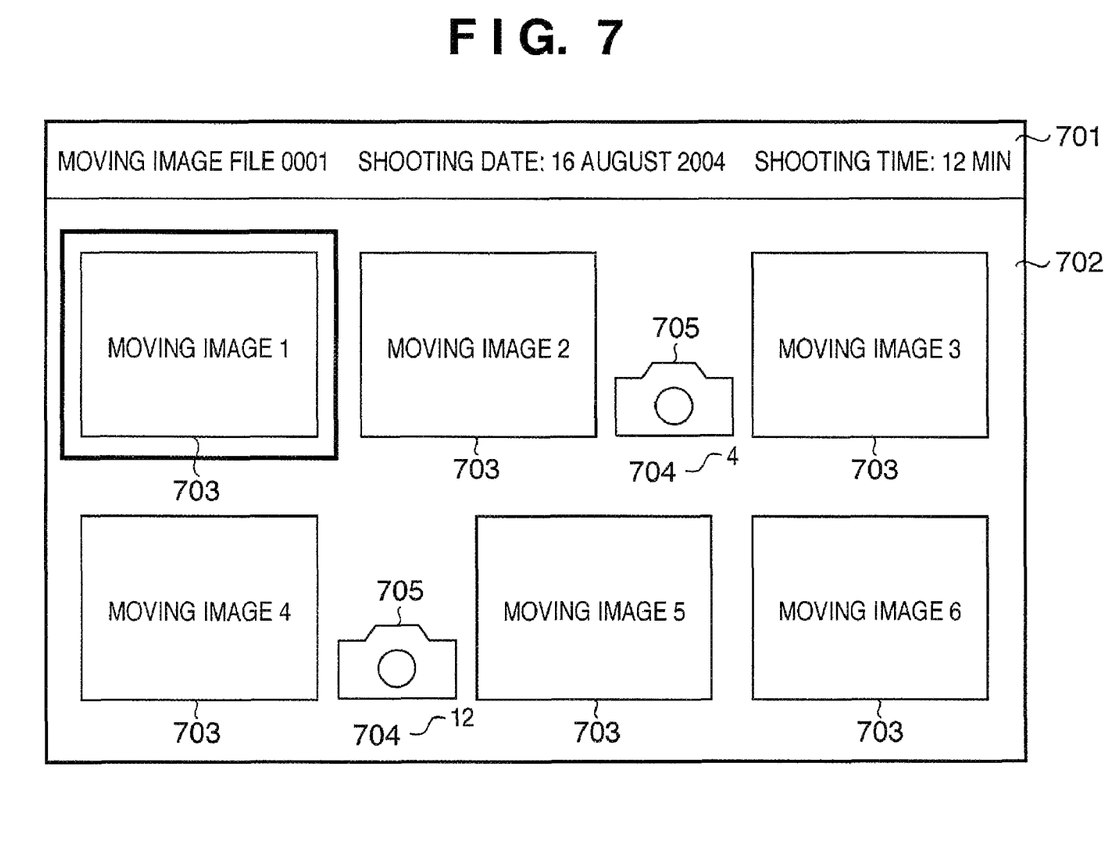
FIG. 7 is a view of an index screen in which still image icons are displayed small in a video camera to which is applied an embodiment of the present invention.

In the embodiment illustrated with reference to FIG. 5, an example was given showing thumbnails of moving image data and icons pertaining to still images in the same size. However, as shown in FIG. 7, it is also possible to display still image icons 705 pertaining to still images smaller than thumbnails 703 for moving image data. By displaying the still image icon smaller as in FIG. 7, the still image icon can be displayed without reducing the number of thumbnails indicating moving image data which are displayed. This means providing a process function for generating a screen as shown in FIG. 7 in the process step for generating an index display screen in step S309 in the flowchart in FIG. 3. The number to the bottom right of each still image icon 705 is an image count display 704. Naturally, in a similar manner, the digital video camera 100 can cause the moving icon to be displayed smaller, in the case of the still image index display.

The display mode shown in FIG. 8 may also be used in this case. In other words, still images belonging to one folder may be displayed as a single still image icon. In an embodiment, the still image icon may be displayed to an area other than the index display area 802, for example, the information display area 801, since the still image icon is displayed smaller than the thumbnails.

Other Embodiments

If in the index screen of FIG. 5 to FIG. 7 there are many thumbnails and icons displayed and the display area for each image is extremely small, the image data may be divided into a plurality of groups, displayed by switching with tabs.

Further, in the above embodiments, the magneto-optical disk 108 was used as a storage medium, but it is also possible to use other storage media such as semiconductor memory.

An aspect of the present invention may also be achieved by supplying to a system or an apparatus a storage medium on which software program code is stored for realizing the functionality of the embodiments described above.

In other words, it goes without saying that an aspect of the present invention is achievable also by the system or a computer (or CPU or MPU) of the apparatus reading and executing the program code stored on the storage medium.

In this case, the program code read from the storage medium realizes the functionality of the embodiments described above, and the storage medium on which the program code is stored constitutes the present invention. As storage media for storing the program code, flexible disks, hard disks, optical disks, electromagnetic disks, CD-ROMs, CD-Rs, magnetic tape, non-volatile semiconductor memory cards, ROMs, etc., for example, can be used.

The functionality of the embodiments described above may also be realized by executing the program code read by a computer. However, it goes without saying that cases are also included in which an operating system (OS) running on the computer performs all or part of the actual processes based on the instructions in the program code, and the functionality of the embodiments described above is realized through those processes.

Further, cases are also possible in which the program code read from the storage medium is read into memory provided to a function enhancing board inserted into the computer or a function enhancing unit connected to the computer. It goes without saying that this also includes cases in which a CPU, etc., provided to the function enhancing board or the function enhancing unit performs all or part of the actual processes based on the instructions of the program code and the functionality of the embodiments described above is realized through those processes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-203733, filed Jul. 26, 2006, which is hereby incorporated by reference herein in its entirety.

What is claimed is:

1. A data reproducing apparatus comprising:
a selecting unit configured to select one of a first index display mode and a second index display mode;
a display control unit configured to display, in response to the first index display mode being selected, a first type representative image representing first image data of a first type and a second type icon representing a set of image data of a second type including second image data, and to display, in response to the second index display mode being selected, a first type icon representing image data of the first type including the first image data instead of the first type representative image displayed in the first index display mode, and a second type representative image representing the second image data instead of the second type icon displayed in the first index display mode, wherein the first image data of the first type is moving image data and the set of image data of the second type includes still image data, and wherein each still image data is recorded outside of a sequence of the moving image data; and
a designation unit configured to designate one of a displayed representative image and a displayed icon, wherein the selecting unit switches from the first index display mode to select the second index display mode in response to a displayed second type icon being designated, and wherein the selecting unit switches from the second index display mode to select the first index display mode in response to a displayed first type icon being designated.

2. The data reproducing apparatus according to claim 1, wherein the first type representative image and the second type representative image are thumbnail images.

3. The data reproducing apparatus according to claim 1, wherein the display control unit displays image data indicated by the first type icon together with the first type icon.

4. The data reproducing apparatus according to claim 1, wherein the display control unit displays the second type icon in a smaller size than the first type representative image.

5. The data reproducing apparatus according to claim 1, wherein the display control unit controls an order for displaying first type representative images and the second type icons based on an order of each first image shot time of the first image data.

6. A digital video camera comprising:
a recording unit configured to record moving image data and still image data on a storage medium; and
the data reproducing apparatus according to claim 1.

7. The digital video camera according to claim 6, wherein the first type representative image and the second type representative image are thumbnail images.

8. A method comprising:
selecting a first index display mode from one of a first index display mode and a second index display mode;
displaying, in response to the first index display mode being selected, a first type representative image representing first image data of a first type and a second type icon representing a set of image data of a second type including second image data, wherein the first image data of the first type is moving image data and the set of image data of a second type includes still image data, and wherein each still image data is recorded outside of a sequence of the moving image data;
switching from the first index display mode to select the second index display mode in response to designating a second type icon after selecting the first index display mode;
displaying, in response to the second index display mode being selected by designating a second type icon, a first type icon representing image data of the first type including the first image data instead of the first type representative image displayed in the first index display mode, and a second type representative image representing the second image data instead of the second type icon displayed in the first index display mode.

9. The method according to claim 8, wherein the first type representative image and the second type representative image are thumbnail images.

10. The method according to claim 8, wherein displaying includes displaying image data indicated by the first type icon together with the first type icon.

11. The method according to claim 8, wherein displaying includes displaying the second type icon in a smaller size than the first type representative image.

12. The method according to claim 8, wherein displaying includes controlling an order for displaying first type representative images and the second type icons based on an order of a each first image shot time of the first image data.

13. A non-transitory computer-readable storage medium storing computer executable instructions for causing an apparatus to execute the method according to claim 8.

14. A data reproducing apparatus comprising:
a memory having a folder configured to contain moving image data and still image data, wherein each still image data is recorded outside of a sequence of the moving image data, and wherein a set of still image data includes a plurality of still image data that is recorded after a first moving image data and recorded before any second moving image data that is recorded next after the first moving image data;
a generating unit configured to generate a thumbnail and to generate an icon;
a display unit configured to display thumbnails and icons;
a designation unit configured to designate one of a displayed thumbnail and a displayed icon;
a selecting unit configured to select one of a moving image index display mode and a still image index display mode; and
a control unit, wherein,
in response to the moving image index display mode being selected by the selecting unit, the control unit causes the generating unit to generate both a moving image thumbnail for each moving image data in the folder and a still image icon for each set of still image data and non-set still image data in the folder, and causes the display unit to display generated moving image thumbnails and generated still image icons on a single reproduction screen, and wherein, in response to a displayed still image icon being designated in the moving image index display mode by the designation unit, the control unit causes the still image index display mode to be selected by the selecting unit, causes the generating unit to generate both a still image thumbnail for each still image data in the folder and a moving image icon for each moving image data in the folder, and causes the display unit to display generated still image thumbnails and generated moving image icons on a single reproduction screen.

15. The data reproducing apparatus according to claim 14, wherein, in response to a displayed moving image icon being designated in the still image index display mode by the designation unit, the control unit causes the display unit to display generated moving image thumbnails and generated still image icons on a single reproduction screen.

16. The data reproducing apparatus according to claim 14, wherein the folder is a shooting date folder containing moving image data and still image data from a given calendar date.

17. The data reproducing apparatus according to claim 14, wherein the control unit causes the display unit to display generated still image icons between and remote from generated moving image thumbnails in an order based on still image recorded times of the set of still image data and a moving image shot time of each moving image data.

18. A method for a data reproducing apparatus having a memory, wherein the memory includes a folder configured to contain moving image data and still image data, wherein each still image data is recorded outside of a sequence of the moving image data, and wherein a set of still image data includes a plurality of still image data that is recorded after a first moving image data and recorded before any second moving image data that is recorded next after the first moving image data, the method comprising:

selecting a moving image index display mode;

generating, using a central processing unit and in response to selecting the moving image index display mode, both a moving image thumbnail for each moving image data in the folder and a still image icon for each set of still image data and non-set still image data in the folder;

displaying generated moving image thumbnails and generated still image icons on a single reproduction screen;

designating a displayed still image icon in the moving image index display mode to cause the still image index display mode to be selected;

generating, in response to the still image index display mode being selected by designating the displayed still image icon in the moving image index display mode, both a still image thumbnail for each still image data in the folder and a moving image icon for each moving image data in the folder; and     displaying generated still image thumbnails and generated moving image icons on the single reproduction screen.

19. A non-transitory computer-readable storage medium storing computer executable instructions for causing a data reproducing apparatus execute the method according to claim 18.

\* \* \* \* \*